Oct. 8, 1957  H. HOFSTETTER  2,808,899
FILTERING DEVICE
Filed Sept. 23, 1955

INVENTOR.
HERMANN HOFSTETTER.
BY
*K. B. Mays*
ATTORNEY.

United States Patent Office 2,808,899
Patented Oct. 8, 1957

2,808,899

FILTERING DEVICE

Hermann Hofstetter, Zurich, Switzerland, assignor to Sulzer Frères, S. A., Winterthur, Switzerland, a corporation of Switzerland Application September 23, 1955, Serial No. 536,188

Claims priority, application Switzerland September 25, 1954

3 Claims. (Cl. 183—63)

The present invention relates to a device for filtering gas through a cylindrical screenlike wall of a rotating drum whereby the gas stream flows from the outside to the inside of the drum.

The invention relates more particularly to a filtering device of the aforesaid type in which at least a part of the circumference of the drum is covered by a flexible filter material which is unwound from a supply spool and wound onto a receiving spool after the material has been passed around a portion of the filter drum. According to the invention at least one intermediate roller is interposed between the supply spool and the filter drum, the flexible filter material passing over a part of the circumference of the intermediate roller. The supply spool is pressed against the intermediate roller and rotated at the same circumferential speed as the filter drum upon rotation of the latter.

If only one intermediate roller is provided, this roller may be pressed against the filter drum. If more than one intermediate roller is provided, the roller which is adjacent to the supply spool is preferably driven by an even number of additional rollers which are pressed one against the other, the last of the additional rollers resting, under pressure, on the filter drum and the flexible filter material passing consecutively around parts of the cylindrical surfaces of the rollers. The circumference of the supply spool may also contact the circumference of the receiving spool.

The novel features which are considered characteristic of the invention are set forth with particularity in the appended claims. The invention itself however and additional objects and advantages thereof will best be understood from the following description of embodiments thereof when read in connection with accompanying drawing, in which:

Figure 1:
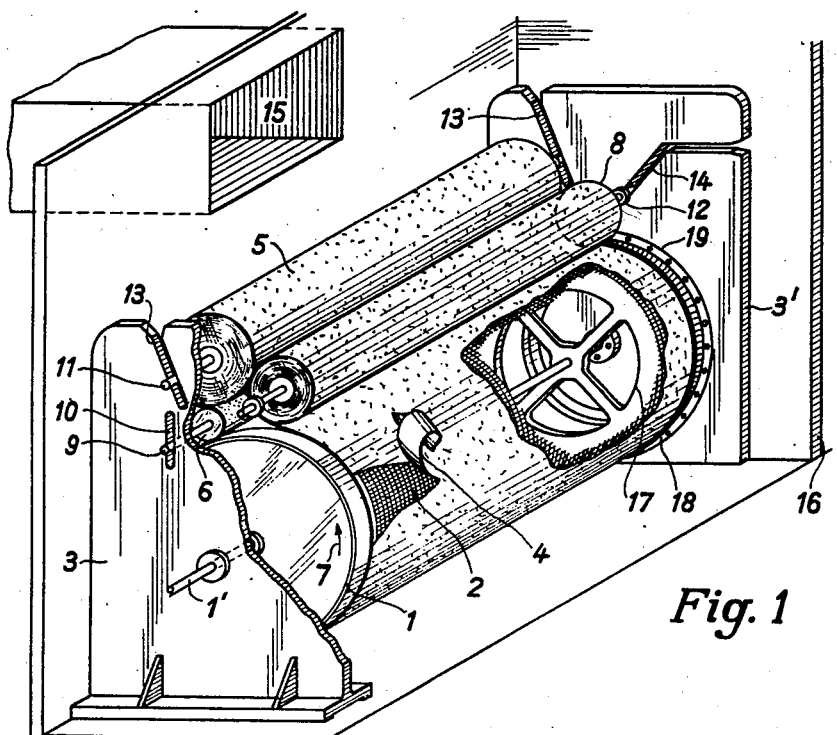
Fig. 1 is a perspective view of a filtering device according to the invention with parts broken off to show underlying parts.
Figure 5:
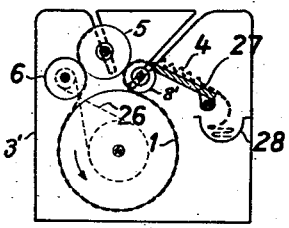

Fig. 5 diagrammatically illustrates a modification of the device shown in Fig. 1 in which the used filter material is disposed of in a different manner.

The same numerals designate the same parts in all figures.

The filtering device illustrated in Fig. 1 serves for removing foreign matter, as dust, fibres, etc. from an air stream, for example in an air conditioning plant for treating the air in a room in which textile fibres are worked. The device includes a drum body 1, whose cylindrical surface is formed by a screen 2. The drum is supported by a shaft 1' borne in suitable bearings in side shields 3 and 3'. The drum is slowly rotated, for example, at a circumferential speed of 1 m per hour by suitable means, not shown, actuating the shaft 1'. Rotation may be effected only periodically. A portion of the circumference of the screen cylinder 2 is covered by a flexible material 4 made of filter material which is permeable to air. A porous filter paper may be provided for this purpose. Upon rotation of the filter drum the filter material is unwound from a supply spool 5 having a shaft 11 which is rotatably supported parallel to the rotation axis of the filter drum 1. An intermediate roller 6 having a shaft 9 is interposed between the supply spool 5 and the drum 1, the former resting on the intermediate roller and being pressed thereto by the weight of the supply spool. The intermediate roller rests on the drum 1 and is pressed thereto by the weight of the roller and that of the supply spool. By suitable placement of the filter material on the spool, the roller, and the drum the roller 6 is rotated in opposite direction to the direction of rotation of the spool 5 and of the drum 1, arrow 7.

The filter material 4, after being unwound from the spool 5, surrounds part of the circumference of the roller 6 and of the drum 1 and, after having served its filtering purpose, is wound on a receiving spool 8. The latter has a shaft which is parallel to the rotation axes of the spool 5, the roller 6, and the drum 1. The receiving spool 8 rests on the drum 1 and is pressed thereto by its weight. The ends of the shaft 9, preferably stumps only being provided at either end of the roller 6, are guided in slots 10 in the end shields 3 and 3'. The ends of the shafts 11 and 12, which also may be in the form of stumps, are guided in inclined slots 13 and 14, respectively, in the shields 3 and 3'. In this way the rotation axes of the supply spool 5 and of the receiving spool 8 are permitted to move as is needed when their diameters change so that the supply spool will always rest on the intermediate roller 6 and the latter on the drum 1 and the receiving spool 8 will always rest on the drum 1 and the spools, the roller, and the drum will always rotate at like circumferential speeds.

The filtering device is placed in a closed chamber into which the air to be filtered is introduced through a duct 15. The chamber has a wall 16 separating the chamber from the inlet of an air conditioning plant, not shown. The air entering through the duct 15, which air contains dust and other undesirable matter, flows through the filter material 4 and through the screen 2 into the interior of the drum 1.

The right end wall of the filter drum 1 (Fig. 1) is provided with outlet openings 17 through which the filtered air, which travels in axial direction from left to right inside the drum 1, escapes through suitable openings in the shield 3' and in the wall 16 into the space at the right of the wall 16. A fan, not shown, forming part of the air conditioning plant at the right side of the wall 16 maintains air circulation through the filtering device.

The foreign matter retained by the filter material 4 adheres to the latter and is wrapped between the layers of the used filter material on the receiving spool 8. An annular leather packing 18 held to the shield 3' by means of a metal ring 19 seals the interior of the drum 1 against the outside. The packing is in the form of a sleeve which is sucked to the outside surface of the drum by the suction produced by the fan of the air conditioning plant.

The described arrangement of the intermediate spool 6 effects rotation of the supply spool 5 in the same direction in which the drum rotates. The outside of the filter material 4 unwound from the supply spool is not in contact with the outside surface of the filter drum and the side of the filter material, which is on the inside when wound on the drum 1, is free of dust and the like which, otherwise, may pass through the screen 2 into the interior of the drum 1. If the supply spool would rest on the drum and rotate oppositely to the direction of rotation of the drum, dust and the like may enter the interior of the filter drum.

The aforedescribed arrangement of the guide or intermediate roller 6 affords unwinding of the filter material from the supply spool without undue tension of the filter material, upon rotation of the filter drum. The size and shape of the spool of filter material does not affect the operation of the device. Therefore, very fine fibre fleeces can be used as filter material which have practically no tensile strength in the direction of movement of the filter material. Aside from the reduction of the resistance to the flow or the air or gas, to be filtered, the device according to the invention requires very little attention because great lengths of filter material can be wound on the supply spool and also on the receiving spool. Tearing of the filter material is almost completely eliminated so that the device operates without interruptions also if it is not permanently attended. The cost of the filter material needed for the device according to the invention is low.

Figure 2:
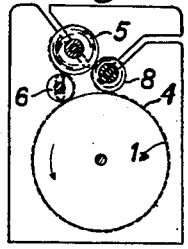
Fig. 2 is a schematic illustration of the spool, intermediate roller, and filter drum arrangement used in the embodiment of the invention shown in Fig. 1.

Fig. 2 schematically illustrates the arrangement of the drum, spools, roller, and of the path of the filter material in the device according to Fig. 1. The filter material is shown by a dotted line.

Figure 3:
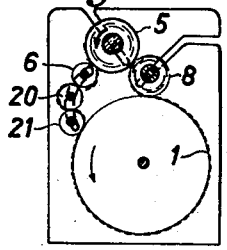
Fig. 3 is a schematic illustration of a modified spool, roller, and drum arrangement.

In the arrangement schematically shown in Fig. 3 an even number of intermediate rollers 20 and 21 is interposed between the guide roller 6 and the filter drum 1, the roller 6 resting on the roller 20, the latter resting on the roller 21 which rests on the drum 1. If the latter is rotated, the supply roller 5 is rotated in the same direction as the drum 1. The filter material unwinding from the supply spool 5 consecutively passes partly around the guide roller 6 and the intermediate rollers 20 and 21 before reaching the drum 1 from which the filter material is wound onto the receiving spool 8. Dust settling on the outside of the filter material as it is unwound from the spool 5 cannot come in contact with the screen 2 of the drum 1 and cannot be carried by the air or gas stream into the inside of the drum 1 because the outside of the filter material unwinding from the spool 5 is also on the outside when the material is wrapped around the drum 1.

Figure 4:
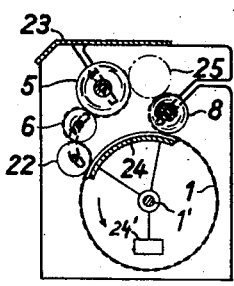
Fig. 4 is a schematic illustration of a further modification of a spool, roller, and drum arrangement.

Fig. 4 illustrates a further modification of the arrangement of the spools, rollers, and of the filter drum. The guide roller 6 which frictionally engages the supply spool 5 is driven by a single intermediate roller 22 which is pressed to the drum 1. The supply spool rotates in a direction which is opposite to the direction of rotation of the drum 1. Therefore, the outside of the filter material unwinding from the supply spool 5 is on the inside and contacts the screen 2 when the filter material is wrapped onto the drum 1. This makes it necessary to provide means preventing settling of dust and the like on the outside of the filter material as it unwinds from the spool 5. A shield 23 shielding the supply spool from the gas stream emerging from the duct 15 may be provided. The receiving spool 8 rotates in the same direction as the supply spool 5 and must therefore not be in contact therewith. The part of the surface of the drum 1 which is not covered by the filter material must be protected by other means against entry of dust. A segment 24 may be provided on the inside of the drum 1, the segment 24 being supported by the shaft 1' and held in proper position by a weight 24'. Instead of/or in addition to the segment 24 an additional roller 25 may be interposed between the supply spool 5 and the receiving spool 8, resting on the spools.

The intermediate roller 6 which is in contact with the supply spool 5 need not be in contact with and rest on the drum 1. The roller 6 may be rotatably supported by the side shields so that the circumference of the roller 6 is spaced from that of the drum. This arrangement is illustrated in Fig. 5, the roller 6 being driven by a belt 26 from the drum 1 at the same circumferential speed as but in opposite direction to the direction of rotation of the drum 1. In this case the filter material 4 must be sufficiently strong to resist the gas or air pressure acting on the material between the roller 6 and the drum 1 unless a seal, such as the segment 24 shown in Fig. 4, is provided sealing the inside of the drum against the outside. Fig. 5 shows a modified system for removing the used filter material. A receiving roller 8' resting on the drum 1 and being in contact with the spool 5 transfers the filter material 4 from the drum to a declining plate 27 from which the material drops into a receiver 28.

In all modifications means are provided which prevent passage of air or gas through the portion of the surface of the drum 1 which portion is not covered by filter material and extends between an intermediate roller and the receiving roller or spool. In Fig. 4 a segment seal is illustrated. This may be omitted, if the ends of the space enclosed by the drum, the intermediate rollers, the supply spool, and the receiver roller are closed, for example, by sheet metal or leather, partly overlapping the end faces of the drum, spool, and rollers and drawn thereto by the difference of the air or gas pressure in the space into which the duct 15 discharges and in the interior of the drum 1.

The invention is not limited to the illustrated embodiments. The intermediate rollers may be arranged in a different manner. If the intermediate roller which is in contact with the supply spool is driven by an even number of additional intermediate rollers the object of the invention is obtained which resides in the prevention of entry of dirt particles which settle down on the outside of the filter material unwinding from the supply spool into the interior of the filter drum. The device according to the invention is not limited to filtering air. It may be used wherever foreign matter carried along by a gas stream must be separated from the gas.

What is claimed is:

1. A device for filtering a gas comprising a hollow filter drum rotatable on its longitudinal axis and having a cylindrical wall built as a screen, means for conducting the gas to be filtered to the outside of said drum, means for removing the filtered gas from the inside of said drum, a flexible filter material passing around a part of the circumference of said cylindrical wall, a supply spool from which said filter material is unwound, a receiving spool onto which said filter material is wound after it has passed said filter drum, and at least one intermediate rotatably mounted roller interposed between said supply spool and said filter drum for guiding said filter material from said supply spool to said filter drum, the longitudinal axes of said spools, of said roller, and of said drum being parallel, said supply spool frictionally engaging said intermediate roller and the latter as well as said receiving spool frictionally engaging said filter drum, affording equal circumferential speeds of said spools, of said roller, and of said drum.

2. A device for filtering a gas comprising a hollow filter drum rotatable on its longitudinal axis and having a cylindrical wall built as a screen, means for conducting the gas to be filtered to the outside of said drum and means for removing the filtered gas from the inside of said drum, a flexible filter material adjacent to a part of the circumference of said cylindrical wall, a supply spool from which said filter material is unwound, a rotatable guide roller interposed between and frictionally engaging said supply spool and said filter drum for guiding said filter material from said supply spool onto and for drive by said filter drum, and means for receiving said filter material after it has passed over said filter drum; the longitudinal axes of said spool, of said roller, and of said drum being parallel, said supply spool resting on said intermediate roller and pressing the latter onto said filter drum affording equal circumferential speeds of said spool, of said roller, and of said drum.

3. A device for filtering a gas as defined in claim 1, including an even number of intermediate rollers interposed between said guide roller and said filter drum and being rotatable on axes parallel to the rotation axis of said drum, said guide roller resting on one of said intermediate rollers, and the latter resting one upon the other, one of said intermediate rollers resting on said drum, said flexible filter material unwinding from said supply spool consecutively passing partly around said guide roller and said intermediate rollers before reaching said drum, and said supply spool rotating in the same direction as said drum.

References Cited in the file of this patent

UNITED STATES PATENTS

| | | |
|---|---|---|
| 1,783,181 | Birkholz | Dec. 2, 1930 |
| 2,327,832 | Vogel | Aug. 24, 1943 |

FOREIGN PATENTS

| | | |
|---|---|---|
| 11,006 | France | Oct. 6, 1909 |
| | (2d addition to No. 366,807) | |